United States Patent [19]

Regnault

[11] 4,335,968
[45] Jun. 22, 1982

[54] TINT RESTORING DEVICE EMPLOYING A THERMAL PRINTING HEAD

[75] Inventor: Luc Regnault, Paris, France

[73] Assignee: Thomson-CSF, Paris, France

[21] Appl. No.: 205,566

[22] Filed: Nov. 10, 1980

[30] Foreign Application Priority Data

Nov. 9, 1979 [FR] France ............................ 79 27711

[51] Int. Cl.$^3$ ............................................... B41J 3/02
[52] U.S. Cl. .................................. 400/120; 219/216; 346/76 PH; 358/78
[58] Field of Search ................ 400/119, 120; 101/426; 219/216; 346/76 PH, 160; 358/78

[56] References Cited

U.S. PATENT DOCUMENTS

| | | | |
|---|---|---|---|
| 3,604,846 | 9/1971 | Behane et al. | 358/78 X |
| 3,964,388 | 6/1976 | Maxwell | 346/160 X |
| 3,975,707 | 8/1976 | Ito et al. | 346/76 PH |
| 4,020,465 | 4/1977 | Cochran et al. | 346/76 PH |
| 4,039,065 | 8/1977 | Seki et al. | 400/120 |
| 4,113,391 | 9/1978 | Minowa | 400/120 |
| 4,141,018 | 2/1979 | Mizuguchi et al. | 400/120 |
| 4,205,395 | 5/1980 | Shortridge | 346/76 PH X |
| 4,216,481 | 8/1980 | Hakoyama | 346/76 PH |
| 4,224,869 | 9/1980 | Moriw | 400/120 |
| 4,262,188 | 4/1981 | Beach | 346/76 PH |

*Primary Examiner*—E. H. Eickholt
*Attorney, Agent, or Firm*—Oblon, Fisher, Spivak, McClelland & Maier

[57] ABSTRACT

A reading head scans a document to be reproduced line by line and delivers an analog signal the amplitude variations of which represent the variations in tint on the document. An analog-digital converter preceded by a sampler for sampling the analog signal delivers, in respect of each line scanned, n digital samples (where n is a positive integer) corresponding to the tints to be reproduced on a line of a sheet of thermosensitive paper. For each line to be reproduced, a set of storage shift registers generates n control signals which are functions of the digital values of the n samples associated to the tints to be reproduced. These signals control power supply means for feeding n resistors on a thermal printing head.

3 Claims, 2 Drawing Figures

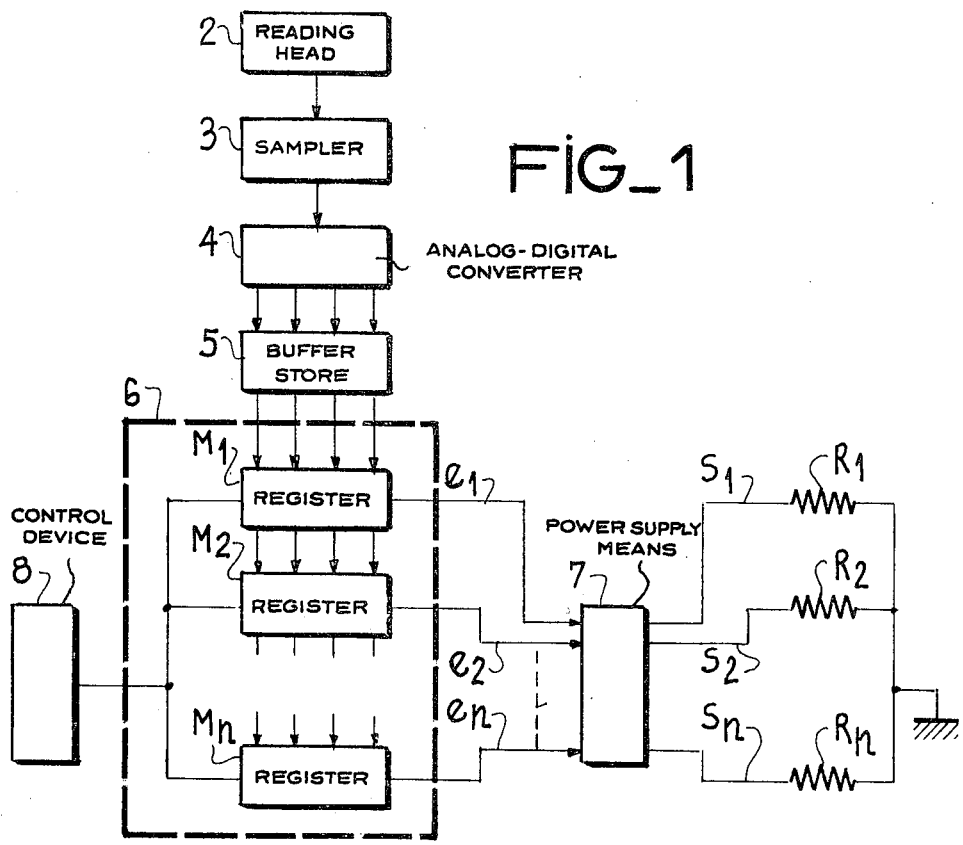
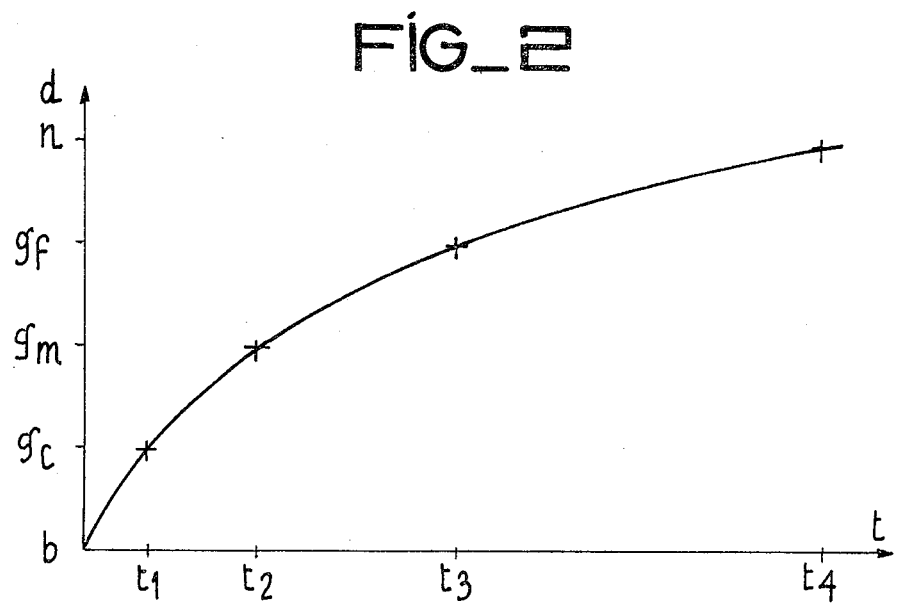

TINT RESTORING DEVICE EMPLOYING A THERMAL PRINTING HEAD

The present invention relates to tint restoring devices employing a thermal printing head, and more particularly to thermal printing systems.

The thermal printing art, as used for inscribing a dot, consists in applying a voltage to a microresistor for a very short time, say 5 milliseconds, whereby said resistor leaves an imprint on thermosensitive paper by reason of its rise in temperature.

It is known to embody this technique in devices for reproducing black dots of a size substantially equal to that of the resistor and of optical density equal to the maximum density which the paper will authorize; however, such devices permit inscription in black and white only.

The present invention has for its object to further permit the reproduction of half-tints on a thermosensitive sheet by means of the thermal printing technique.

According to this invention, there is provided a device for restoring p tints (where p is a positive integer) comprising: a thermal printing head with n heating resistors (where n is a positive integer); a reading head for scanning a document line by line and delivering an analog signal the variations in amplitude of which are representative of variations in tint on the document; a sampler for sampling said signal and delivering n signal samples for each line scanned; an analog-digital converter for converting said signal samples and delivering, in respect of each sample, a binary number having q bits (where q is a positive integer); means for storing the n binary numbers delivered by the converter during scanning of a line in the document; power supply means for applying a voltage to each of the n resistors of the thermal printing head, said power supply means having n control inputs; and control means having q inputs for receiving the q bits forming each of the n binary numbers stored by said storage means, and n outputs respectively coupled to said n control inputs of the power supply means whereby to deliver n control signals for controlling the resistor heating time.

The description which follows with reference to the accompanying non-limitative exemplary drawing will give a clear understanding of how the invention can be carried into practice. In the drawing:

FIG. 1 is a block diagram of an exemplary embodiment of the invention; and

FIG. 2 is a graph in which dot optical density is plotted against resistor heating time.

Since they are well-known to the specialist in the art, the clock signals are precision synchronizing devices and have been omitted on the drawings for greater clarity.

Referring first to FIG. 1, a reading head 2 is coupled to the input of an analog-digital converter 4 through a sampler 3. The four outputs of converter 4 are connected respectively to four inputs of a shift storage register $M_n$ through a buffer store 5 and $n-1$ storage shift registers $M_j$ arranged in series (with j varying from 1 to $n-1$, where n is a positive integer). Each of the n registers $M_i$ (where i varies between 1 and n) has an auxiliary input connected to the output of a control device 8 and an auxiliary output connected to a corresponding input $e_i$ of power supply means 7. Each of the n outputs $s_i$ of power supply means 7 is grounded via a corresponding resistor $R_i$.

The n storage registers $M_i$ form a set of storage shift registers 6, which set 6 and control device 8 together form control means of power supply means 7.

The form of embodiment described precedingly enables the following five tints to be restored: white, light gray, medium gray, dark gray and black. To each of these tints is associated a specific heating time. This heating time is the time during which a resistor must be energized for it to restore the associated tint on a sheet of thermosensitive paper. It has been established experimentally that the law linking the optical density to the heating time is a logarithmic law.

Reference is next had to FIG. 2 in which optical density of a dot obtained on thermosensitive paper is plotted against the time for which the resistor associated to that dot has been heated. The values b, $g_c$, $g_m$, $g_f$ and n along the Y-axis correspond to the optical densities of white, light gray, medium gray, dark gray and black respectively. The values $t_1$, $t_2$, $t_3$ and $t_4$ along the X-axis correspond to the heating times required to obtain the densities $g_c$, $g_m$, $g_f$ and n respectively.

The principle of operation of the subject tint restoring device of this invention is as follows:

The reading head 2 scans a document line by line and delivers an analog signal the variations in amplitude of which represent variations in tint on the document. For each line scanned, said analog signal is sampled by sampler 3 to provide n samples.

In the exemplary embodiment hereinbefore described, the five binary numbers 0000, 0001, 0011 and 1111 are respectively associated to the five tints to be reproduced, to wit white, light gray, medium gray, dark gray and black.

Thus, analog-digital converter 4 converts each sample into a four-bit binary number associated to the tint to be reproduced. Buffer store 5 memorizes the binary numbers delivered by the converter in the course of a line scan. The n binary numbers of a line are then transmitted at high speed to the set of storage shift registers 6. On completion of this transfer process, each register $M_i$ has stored therein the binary number corresponding to the ith signal sample of the line scanned on the document. The several outputs of registers $M_i$ then deliver the least weighted bit of the stored number. Control device 8 allows the registers $M_i$ to be shifted simultaneously whereby each register delivers the bits forming its stored binary number in ascending order of weighting. Further, the system is controlled in such manner that the bits of weights 0, 1, 2 and 3 be delivered by registers $M_i$ during the times $t_1$, $t_2-t_1$, $t_3-t_4$ and $t_4-t_3$.

Each of the outputs $s_i$ of power supply means 7 delivers a feed voltage when the corresponding input $e_i$ thereof is in the logic state 1. Each of resistors $R_i$ can therefore be heated for a time equal to $t_1$, $t_2$, $t_3$ or $t_4$.

For instance, for an analog signal sample $e_v$ corresponding to a dark gray tint (where v is an integer included between 1 and n), there is associated by converter 4 the binary number 0111. Resistor $R_v$ will be heated for a time lapse $t_1+t_2-t_1+t_3-t_2$ equal to $t_3$. According to the curve shown in FIG. 2, this heating time $t_3$ corresponds to a dark gray tint, and consequently resistor $R_v$ will reproduce the dark gray tint on thermosensitive paper.

It goes without saying that the invention is by no means limited to the exemplary embodiment herein described and illustrated and that it is manifestly within the ability of the specialist in the art to design a set of storage shift registers 6 different from the one described precedingly.

Further, the subject device of the invention is capable of reproducing any number of tints, it being sufficient for the number of bits in the binary number associated to each tint to be either increased or decreased.

The invention is equally applicable when the resistors are heated in batches instead of individually.

Lastly, the functions of converter 4, read-only memory 5, the set of shift registers 6 and control device 8 could clearly be performed by a microcomputer.

What is claimed is:

1. A device for restoring p tints (where p is a positive integer) comprising: a thermal printing head with n heating resistors (where n is a positive integer); a reading head for scanning a document line by line and delivering an analog signal the variations in amplitude of which are representative of variations in tint on the document; a sampler for sampling said signal and delivering n signal samples for each line scanned; an analog-digital converter for converting said signal samples and delivering, in respect of each sample, a binary number having q bits (where q is a positive integer); means for storing the n binary numbers delivered by the converter during scanning of a line in the document; power supply means for applying a voltage to each of the n resistors of the thermal printing head, said power supply means having n control inputs; and control means having q inputs for receiving the q bits forming each of the n binary numbers stored by said storage means and n outputs respectively coupled to said n control inputs of the power supply means whereby to deliver n control signals for controlling the resistor heating time.

2. A tint restoring device as claimed in claim 1, wherein the control means comprise: a set of storage shift registers having q inputs to receive the q bits of each of the n binary numbers stored by the storage means, n outputs electrically connected respectively to the n control inputs of the power supply means whereby to simultaneously deliver the n equally-weighted bits of the n binary numbers received by the set of storage shift registers, and an auxiliary input for receiving an auxiliary control signal for controlling the time for which the equally-weighted bits must be delivered by the n outputs from the set of storage shift registers; and a control device for generating the auxiliary control signal.

3. A restoring device as claimed in claim 2, wherein the auxiliary control signal generated by the control device is such that the bits of equal weight W (where $0 \leq w \leq q-1$, and where w is a positive integer) are delivered by the set of storage shift registers for a time lapse $t_1^{w+1} - t_1^r$, in which $t_1^r$ assumes the value 0 for w equal to 0 and the value $t_1^w$ for w not equal to 0, where $t_1$ is the time for which the resistor must be heated in order to obtain the lightest desired half-tint.

* * * * *